(12) United States Patent
Williams

(10) Patent No.: US 11,603,072 B2
(45) Date of Patent: Mar. 14, 2023

(54) DUAL STAGE INFLATOR

(71) Applicant: AUTOLIV ASP, INC., Ogden, UT (US)

(72) Inventor: Jeffrey Daniel Williams, Roy, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 17/395,517

(22) Filed: Aug. 6, 2021

(65) Prior Publication Data
US 2023/0044860 A1   Feb. 9, 2023

(51) Int. Cl.
*B60R 21/264* (2006.01)
*B60R 21/263* (2011.01)

(52) U.S. Cl.
CPC ........ *B60R 21/2644* (2013.01); *B60R 21/263* (2013.01); *B60R 2021/2633* (2013.01); *B60R 2021/2648* (2013.01)

(58) Field of Classification Search
CPC ...................... B60R 21/264; B60R 2021/2642
See application file for complete search history.

(56) References Cited

U.S. PATENT DOCUMENTS

| | | | | |
|---|---|---|---|---|
| 4,989,896 | A * | 2/1991 | DiSalvo | B60R 21/2165 280/732 |
| 6,612,607 | B1 * | 9/2003 | Takahashi | B60R 21/2171 280/732 |
| 6,955,376 | B1 * | 10/2005 | Labrie | B29C 45/1704 280/732 |
| 7,150,227 | B2 * | 12/2006 | Matsuda | B60R 21/2644 102/202 |
| 8,240,709 | B1 * | 8/2012 | Quioc | B60R 21/2644 280/741 |
| 9,624,140 | B2 * | 4/2017 | Fujisaki | C06D 5/06 |
| 10,377,336 | B2 * | 8/2019 | Lu | B60R 21/2171 |
| 10,875,489 | B2 * | 12/2020 | Hirooka | B60R 21/264 |
| 2002/0175509 | A1 * | 11/2002 | Iwai | B60R 21/2644 280/741 |
| 2003/0057686 | A1 | 3/2003 | Goetz | |
| 2003/0127840 | A1 * | 7/2003 | Nakashima | B60R 21/2644 280/741 |
| 2003/0132623 | A1 * | 7/2003 | Iwai | B60R 21/2644 280/736 |
| 2004/0124618 | A1 | 7/2004 | Schonhuber et al. | |
| 2004/0163565 | A1 | 8/2004 | Gabler et al. | |

(Continued)

FOREIGN PATENT DOCUMENTS

| | | | | |
|---|---|---|---|---|
| CN | 110228441 A * | 9/2019 | ............. | B60R 21/26 |
| EP | 3666600 A1 * | 6/2020 | ............. | B60N 2/002 |
| WO | 2007064423 A2 | 6/2007 | | |

OTHER PUBLICATIONS

International Search Report and Written Opinion regarding Patent Application No. PCT/US2022/073347, dated Oct. 7, 2022.

*Primary Examiner* — Barry Gooden, Jr.
(74) *Attorney, Agent, or Firm* — Harness, Dickey & Pierce, P.L.C.; Stephen T. Olson

(57) ABSTRACT

A dual stage inflator for an inflatable vehicle safety device includes a second stage combustion cup having a first member and a second member. The first and second members are formed separately from one another and cooperate to define an interior for receiving a second stage gas generant material.

10 Claims, 2 Drawing Sheets

(56) References Cited

U.S. PATENT DOCUMENTS

| | | | |
|---|---|---|---|
| 2007/0108741 A1* | 5/2007 | Yasuda | B29C 66/54 280/728.3 |
| 2007/0120349 A1* | 5/2007 | Hoffman | B60R 21/2644 280/741 |
| 2010/0078920 A1* | 4/2010 | Terai | B60R 21/215 280/728.3 |
| 2011/0018241 A1* | 1/2011 | Wagner | B60R 21/2165 280/728.3 |
| 2014/0167396 A1* | 6/2014 | Webber | B60R 21/2155 280/743.1 |
| 2014/0375025 A1* | 12/2014 | Pauthier | B60R 21/216 156/245 |
| 2015/0225308 A1* | 8/2015 | Fujisaki | C06B 31/00 280/740 |
| 2016/0075301 A1* | 3/2016 | Kwasnik | B60R 21/205 280/728.3 |
| 2016/0362082 A1* | 12/2016 | Okuyama | B60R 21/264 |
| 2019/0061677 A1* | 2/2019 | Izu | B01J 7/00 |
| 2019/0100164 A1* | 4/2019 | Citko | B60R 21/2171 |
| 2019/0143929 A1* | 5/2019 | Lu | B60R 21/2165 280/728.3 |
| 2019/0322239 A1* | 10/2019 | Norman, III | B60R 21/2644 |
| 2019/0329727 A1* | 10/2019 | Onorato Estevez | B60R 21/2334 |
| 2020/0238940 A1* | 7/2020 | Swiniarski | B60R 21/2165 |
| 2020/0290550 A1* | 9/2020 | Kokubu | B60R 21/215 |
| 2020/0307487 A1* | 10/2020 | Sherman | B60R 21/215 |
| 2021/0101555 A1* | 4/2021 | Schorn | B60R 21/205 |
| 2022/0268558 A1* | 8/2022 | Yamamoto | F42B 3/04 |

* cited by examiner

DUAL STAGE INFLATOR

FIELD

The present disclosure generally concerns an inflator for providing inflation gases for an inflatable vehicle safety device, such as an inflatable airbag. More particularly, the present disclosure concerns a dual stage inflator for an inflatable vehicle airbag including a second stage combustion cup having a variable gas generant capacity.

BACKGROUND

This section provides background information related to the present disclosure which is not necessarily prior art.

Inflatable occupant restraints or airbags are commonly included on motor vehicles to provide impact protection for occupants of the motor vehicle. In the event of an accident, one or more sensors within the vehicle measure abnormal deceleration, for example, and trigger inflation of the airbag within a few milliseconds with gas produced by a device commonly referred to as an "inflator". The inflated airbag cushions and protects the motor vehicle occupant from impact forces.

Various types of inflators have been disclosed in the art for the inflation of airbags. One known inflator devices is shown and described in commonly assigned U.S. Pat. No. 6,189,927. The inflator of the '927 patent is an adaptive pyrotechnic inflator, or dual stage inflator, having gas generant materials in two chambers. The gas generant materials are independently activated by two ignition devices. The gas generant material-containing chambers of such inflators may be referred to as "combustion chambers" as the gas generant material therein is combusted or otherwise reacted to produce gas used to inflate an associated occupant restraint. U.S. Pat. No. 6,189,927 is hereby incorporated by reference as if fully set forth herein.

Another known dual stage inflation device is shown and described in commonly assigned U.S. Ser. No. 17/189,336. The inflator of this application includes a housing defining a first chamber. The first chamber contains a first gas generant material. A combustion cup is disposed in the first chamber and defines an interior containing an ignitor material. A first ignitor device extends into the interior of the combustion cup. A combustion cup and a lid disposed in the first chamber cooperate to define a second chamber containing a second gas generant material. The combustion cup includes a cup sidewall and an open end. The lid is normally in a closed position relative to the cup sidewall to close the open end of the combustion cup and is moveable away from the cup sidewall in response to an increase of pressure within the combustion cup for venting combustion gas out of the combustion cup. A second ignitor device extends into the combustion cup. At least one of the lid and the cup sidewall includes an axially elongated venting geometry that is gradually revealed in response to movement of the lid away from the cup sidewall. U.S. Ser. No. 17/189,336 is hereby incorporated by reference as if fully set forth herein.

While known inflators for inflatable occupant restraints, including but not limited to the inflators of U.S. Pat. No. 6,189,927 and U.S. Ser. No. 17/189,336, have generally proven to be suitable for their intended uses, a continuous need for improvement in the relevant art remains.

SUMMARY

This section provides a general summary of the disclosure, and is not a comprehensive disclosure of its full scope or all of its features.

It is a general object of the present teachings to provide a dual stage inflator having a fixed first stage performance and a variable second stage performance that can be tuned for particular applications.

In accordance with one particular aspect, the present teachings provide a second stage combustion cup for a dual stage inflator of an inflatable vehicle safety device. The second stage combustion cup includes a first member and a second member. The first and second members are formed separately from one another and cooperate to define an interior for receiving a second stage gas generant material. The second member may include an amount of second stage gas generant material that may be varied to tune the performance of the inflator for particular applications.

In accordance with another particular aspect, the present teachings provide a dual stage inflator for an inflatable vehicle safety device. The dual stage inflator includes a housing and first and second combustion cups disposed in the housing. The second combustion cup may be a second stage combustion cup including a first member and a second member formed separately from the first member and coupled to the first member. The first and second members cooperating to define an interior for receiving a second stage gas generant material.

In accordance with yet another particular aspect, the present teachings provide a method of assembling a dual stage inflator for an inflatable vehicle safety device including first and second cups or combustion cups, the first cup being an ignitor cup containing ignitor material and the second cup being a second stage combustion cup containing a second stage combustion material. The method includes inserting a first member of the second stage combustion cup into a housing of the inflator and inserting the first stage combustion cup into the housing. The method additionally includes inserting a second member of the second stage combustion cup into the housing after the first member of the second stage combustion cup and the first stage combustion cup are inserted into the housing. The method further includes coupling the second member to the first member while the first and second members are in the housing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
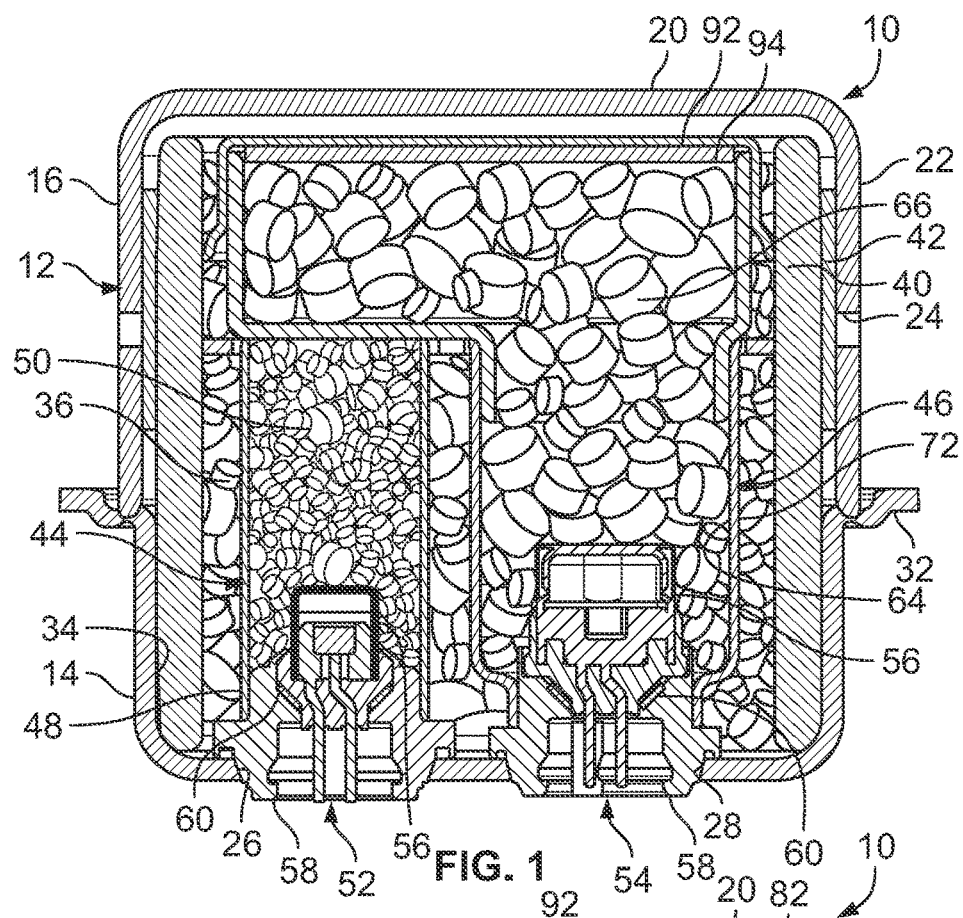
FIG. 1 is a cross-sectional view of an inflator for an inflatable vehicle safety device in accordance with the present teachings, the inflator shown prior to activation.

One or more example embodiments will now be described more fully with reference to the accompanying drawings. The one or more example embodiments are provided so that this disclosure will be thorough and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, and that the example embodiment should not be construed to limit the scope of the present disclosure. Well-known processes, well-known device structures, and well-known technologies are not described herein in detail.

The phrases "connected to", "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "adjacent" refers to items that are in close physical proximity with each other, although the items may not necessarily be in direct contact. "Exemplary" as used herein means serving as a typical or representative example or instance, and does not necessarily mean special or preferred.

With general reference to drawings, a dual stage inflator for an inflatable occupant protection device such as an inflatable airbag in accordance with the present teachings is illustrated and generally identified at reference character 10. The inflator 10 shown in the drawings is a dual-stage inflator particularly adapted for a passenger side front airbag. It will be understood, however, that various aspects of the present teachings may be readily adapted for use with driver side front airbags and other airbags.

The inflator 10 is generally illustrated to have a cylindrical external outline and to include a housing 12 formed of two structural components, i.e., a first housing portion or base portion 14 and a second housing portion or diffuser cap portion 16. As such, the housing 12 may have a generally circular cross section. The first and second housing portions 14 and 16 may be formed of steel, aluminum or other suitable material and may be secured to one another by inertia welding, for example, or otherwise suitably connected to one another. In the particular embodiment illustrated, the housing 12 may have a diameter of approximately 65.8 mm and a length L of approximately 68 mm. It will be understood, however, that these dimensions are exemplary and may be readily adapted within the scope of the present teachings.

As shown in the drawings, the second housing portion 16 may be considered an upper housing portion and the first housing portion 14 may be considered a lower housing portion. These descriptors (e.g., upper and lower) and any other directional descriptors used with regard to the housing portions 14 and 16 and elsewhere herein with respect to other features or elements will be understood to merely provide an ease of reference to the drawings and will be understood not to be limiting. The second housing portion 16 is in the general shape of an inverted bowl and includes an end wall 20 and a cylindrical sidewall 22. The sidewall 22 includes a plurality of spaced gas exit ports 24.

The first housing portion 14 includes first and second mounting openings, designated by the reference numerals 26 and 28, respectively, the use of which will be discussed in greater detail below. The first housing portion 14 may be integrally formed to include a peripheral mounting bracket 32 that extends radially outward from the housing 12.

The housing 12 is configured to define an interior or chamber 34. The interior 34 of the housing 12 may be generally cylindrical. The chamber 34 contains or houses a supply of a first gas generant material or first stage gas generant material 36, typically in the form of a pyrotechnic, such as known for use in airbag inflators. Surrounding the first gas generant material 36 is a filter 40. The filter 40 may be formed of multiple layers or wraps of a metal screen. Surrounding the filter 40 and generally adjacent an inner surface of the sidewall 22 is an adhesive-backed foil seal 42. The adhesive-backed foil seal 42 may hermetically seal the gas generant material 36 within the inflator 10, thereby protecting the gas generant material 36 from ambient conditions, such as moisture.

The inflator 10 includes first and second cups or combustion cups 44 and 46 disposed within the interior 34 of the housing 12. The first cup may be an ignitor cup or ignitor tube 44 and the second cup may be a second stage combustion cup 46. The first combustion cup 44 may include a cylindrical sidewall 48. An ignitor material 50 is contained within the first cup 44. A first stage ignitor device or first ignitor 52 is mounted to the housing 12 via the first mounting opening 26 and extends into the first cup 44. A second stage ignitor device or second ignitor 54 is mounted to the housing 12 via the second mounting opening 28 and extends into the second stage combustion cup 46. Insofar as the present teachings are concerned, it will be understood that the first and second ignitor devices 52 and 54 may take the form of a known pyrotechnic initiator device. As such the first and second ignitor devices 52 and 54 may include a squib 56, a squib adaptor or holder 58, and a squib seal 60. The ignitor devices 52 and 54 are conventionally mounted to or mated with the housing 12 by the squib adaptors or holders 58. The squib seal 60 conventionally seals the squib 56 with the adaptor 58.

The first cup 44 may be formed of a gas-impermeable material, such as metal, with the cylindrical sidewall 48 including a plurality of spaced, preferably, generally uniformly spaced gas exit orifices 62. The gas exit orifices 62 may be normally (e.g., when the inflator 10 is in a static or prior to actuation state) covered and the passage of material therethrough prevented by a pressure sensitive covering or barrier, such as by an adhesive-backed foil seal wrap or the like as is well known in the art. As is known, the covering may be selected to open or rupture upon the application of a predetermined pressure from the interior of the first cup 44.

Figure 2:
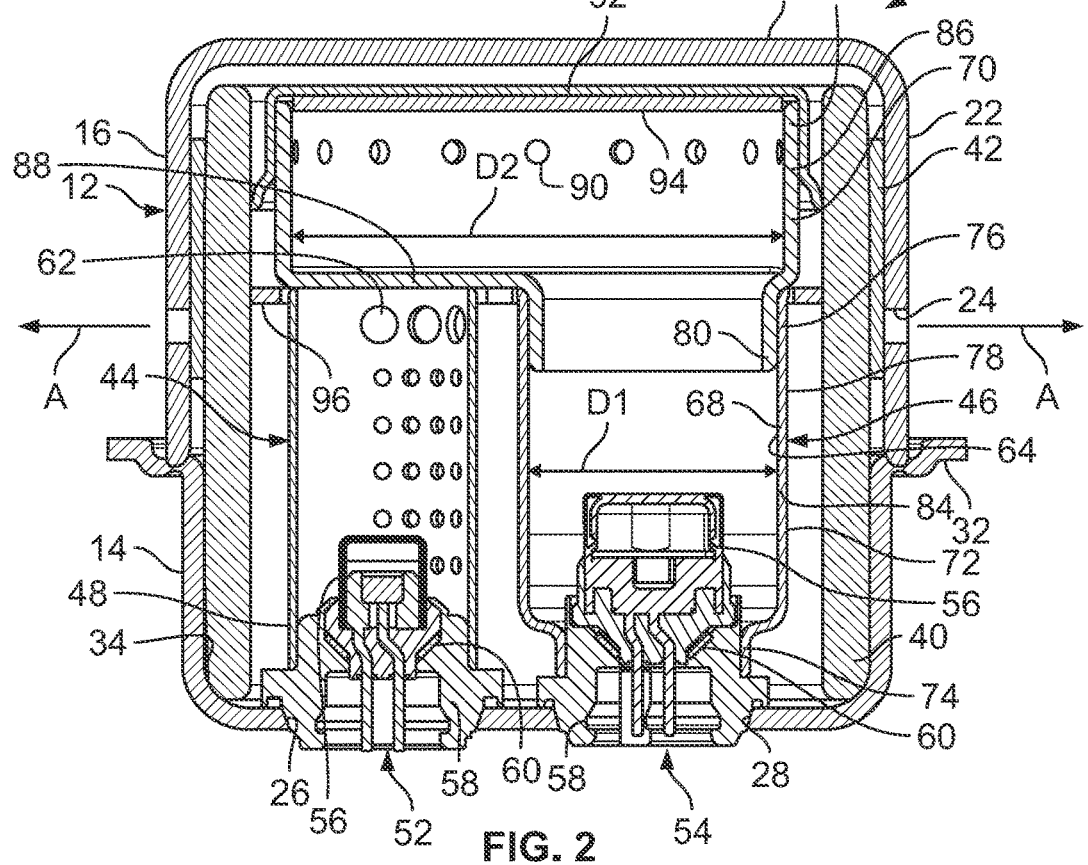
FIG. 2 is another cross-sectional view of the inflator of FIG. 1, the inflator shown without ignitor material and without gas generant materials for purposes of illustration.
Figure 3:
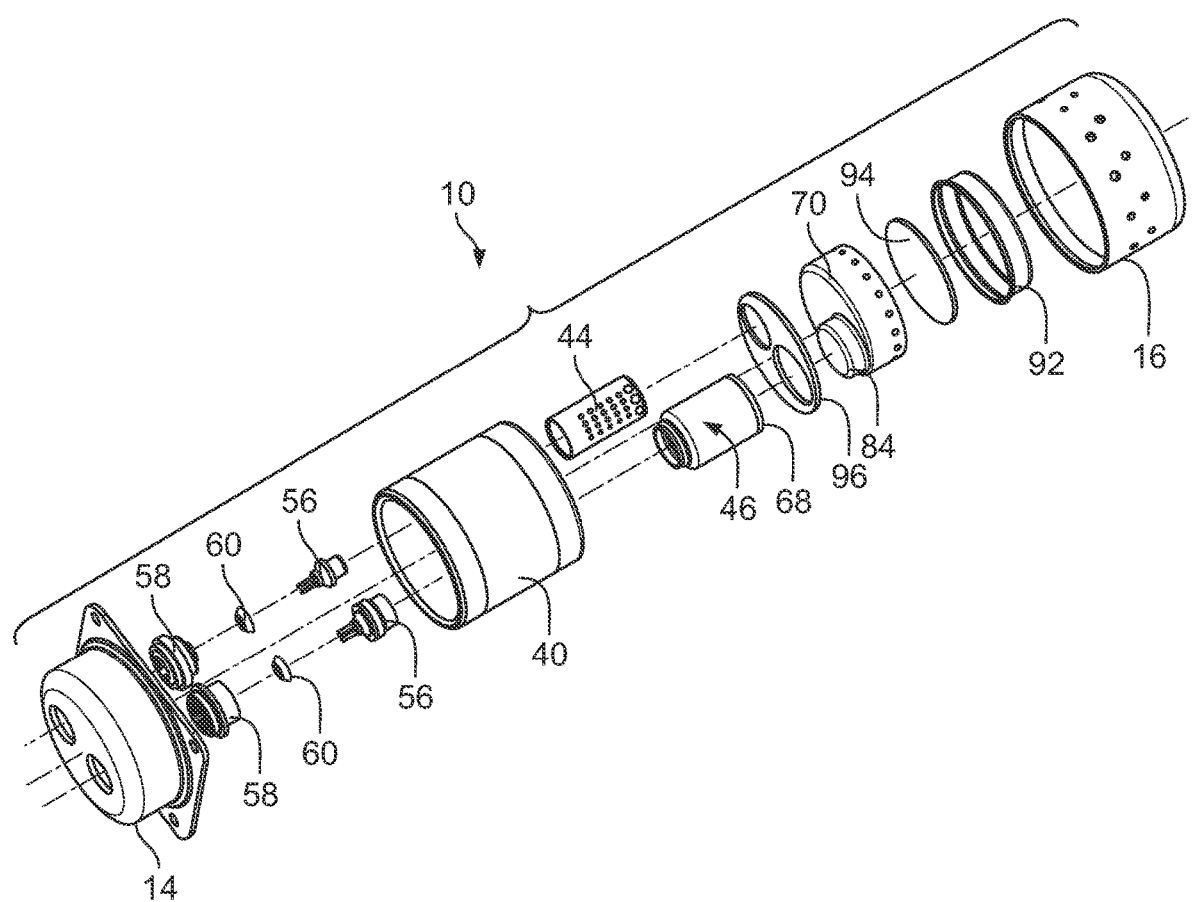
FIG. 3 is an exploded perspective view of the inflator of FIG. 1.

When actuated, ignition of the ignitor material 50 results in an increase in pressure within an interior of the first cup 44 with the subsequent predetermined rupturing or opening of the covering to permit passage of ignition products produced by the combustion of the ignitor material 50 through the exit orifices 62, from the first ignitor device 52 to the gas generant material 36 contained within the interior of the housing 12. The resulting contact by or between the ignition products and the first gas generant material 36 results in the ignition and reaction of the first gas generant material 36. The inflation gases produced pass through the filter 40, rupture the foil seal 42 and pass through the gas exit ports 24 (as signified by the arrows A in FIG. 2) and out of the inflator 10 into an associated airbag cushion (not shown).

The second stage combustion cup 46 is shown in the embodiment illustrated to be constructed of a plurality of discrete parts or members that cooperate to define an interior 64 having an interior volume for storing a second gas generant material 66. The second gas generant material 66 may be in the form of a pyrotechnic material and may be either the same or different in composition, shape, size or form, as compared to the first gas generant material 36. As shown in the drawings, the second stage combustion cup 46 may include a first or lower member 68 and a second or upper member 70 that are separately formed and cooperate define to define the interior 64 receiving the second gas generant material 66. The first and second members 68 and 70 may be press-fit together or otherwise secured to one another in any manner well known in the art. The second stage combustion cup 46 may alternatively include three or more members within the scope of the present teachings. As will be appreciated more fully below, the amount of second stage gas generant material within the second stage combustion cup 46 may be varied to tune the performance of the inflator 10.

The first member 68 of the second stage combustion cup 46 may be formed of a gas-impermeable material, such as metal, to include a sidewall 72, a first axial end 74 and a second axial end 76. The first axial end is an open end 74 closed by the second ignitor device 54. In the embodiment illustrated, the cup sidewall 72 is a cylindrical sidewall 72. The first member 68 includes a first diameter $D_1$.

The second member 70 of the second stage combustion cup 46 may be similarly formed of a gas-impermeable material, such as metal, to include a sidewall 78, a first or lower axial end 80 and a second or upper axial end 82. The first and second axial ends 80 and 82 are open ends. In the embodiment illustrated, the sidewall 78 includes a first cylindrical portion 84 adjacent the first axial end 80 and a second cylindrical portion 86 adjacent the second axial end 82. The first and second cylindrical portions are first and second axially extending portions 84 and 86, respectively. The first cylindrical portion 84 of the second member 70 defines a male portion received within the open upper end 76 of the first member 68. In this regard, the first member 68 defines a female portion. The first cylindrical portion 84 has an outside diameter nominally small than the first diameter $D_1$ of the first member 68 such that the first cylindrical portion 84 may be press-fit to the first member 68. In other embodiments, the first member 68 may define the male portion and the first cylindrical portion 84 may define the female portion. Explaining further, one of the first and second members 68 and 70 defines the male portion and the other of the first and second portions 68 and 70 defines the portion receiving the male portion.

The second cylindrical portion 86 of the second member 70 has a second inner diameter $D_2$. The second inner diameter $D_2$ is greater than the first inner diameter $D_1$. The second member 70 further includes a radially extending flange 88 between the first and second axially extending portions 84 and 86.

The second cylindrical portion 86 of the sidewall 78 of the second member 70 may include a plurality of spaced, preferably, generally uniformly spaced gas exit orifices 90. The gas exit orifices 90 may be normally (e.g., when the inflator is in a static or prior to actuation state) covered by a lid 92 that closes the second end of the second member 70 and axially extends over a portion of the second cylindrical portion 86 that includes the gas exit orifices 90.

When actuated, combustion of the gas generant material 66 within the second combustion cup 46 results in an increase in pressure within the interior of the second stage combustion cup 46. The increase of pressure within the second ignitor 46 displaces the lid 92 away from the second member 70 to reveal the gas exit orifices 90. Again, the inflation gases produced pass through the filter 40 and through the gas exit ports 24 (as signified by the arrows A in FIG. 2) and out of the inflator 10 into the associated airbag cushion (not shown).

With continued reference to the drawings, a method of the present teachings for assembling the dual stage inflator will now be described. Assembly may begin by inserting the squib adaptors 58 into the housing 12 and welding the adaptors 58 to the housing 12. The squibs 56 and the filter 40 may then be inserted into the housing 12. Prior to insertion of the second stage combustion cup 46, the first stage combustion cup or ignitor tube 44 is inserted into the housing 12 and loaded with ignitor material 50. The first member 68 of the second stage combustion cup 46 is next inserted. In a next assembly step, the first gas generant material 66 is loaded into the housing and a first stage damper pad 94 may be inserted. The second member 70 of the second stage combustion cup 46 may then be inserted and press-fit to the first member 68 in the manner discussed above. As illustrated, the second member 70 of the second stage combustion cup 46 radially extends over and covers the open upper end of the first stage combustion cup. The second gas generant material 66 is then loaded into the second stage combustion cup 46. The amount of second gas generant material may vary depending on desired performance of the inflator 10. The second stage damper pad 96 is inserted and the lid 92 is press-fit to the second member 70. The diffuser 16 of the housing 12 is put in place and inertia welded to the base 14. The two-member configuration of the second stage combustion cup 46 of present teachings advantageously allows first stage generant loading prior to second stage generant loading. The enlarged volume area of the second member 70 of the second stage combustion cup 46 over the top of the first generant load that is sealed and independent.

It will be appreciated that the inflator 10 in accordance with the present teachings can provide a tune-able performance in accordance with selected operating conditions as may be required or desired for particular inflatable restraint system installations and applications. In operation, both the quantity or rate of inflation gas production can be appropriately varied, such as at the time of a vehicle crash or collision incident, to take into account one or more conditions of occupant presence. Such inflator performance adaptability results is provided by the two discrete and ballistically isolated chambers of gas generant materials of the inflator 10 of the present teachings.

For example, such the inflator 10 may be operated to have a first stage discharge in which the igniter material 50 is ignited to produce combustion products which are passed to the chamber 34 to combust the first gas generant material 36. In this manner, inflation gas may be produced at a first output level without actuating or firing the second igniter device 54 to activate the gas generant material 66 contained in the second stage combustion cup 44. As will be appreciated, such operation may be desired to provide a minimized or reduced inflator output such as may be desired in an instance of a low speed collision, for example. Alternatively, an inflator 10 in accordance with the present teachings may be operated such that both the first and second igniter devices 52 and 54 are actuated.

As will be appreciated, such operation and ignition of both the first and second igniter devices 52 and 54 and first and second gas generant materials 36 and 66 may involve the simultaneous or near simultaneous actuation and firing of the first and second igniter devices 52 and 54. Such simultaneous or near simultaneous actuation may be desired to provide a rapid inflation and deployment of an associated airbag cushion. For example, this rapid inflation and deployment may be desired in response to a high speed or severe vehicle collision. Alternatively, sequential actuation and firing of the first and second igniter devices 52 and 54 may be desired in response to detection of a moderately severe vehicle collision. Further, with such sequential actuation and firing, the time lag or delay between the actuation and firing of the first and second squibs and, in turn, the combustion of the first and second gas generant materials 36 and 66 may be tailored to meet the specific requirements for a particular inflatable restraint system installation, as will be appreciated by those skilled in the art. Thus, such inflator assemblies are particularly suited for application as adaptive output inflators in that they may be made generally dependent on one or more selected operating conditions such as ambient temperature, occupant presence, seat belt usage and rate of deceleration of the motor vehicle, for example.

While specific embodiments and applications of the present disclosure have been illustrated and described, it is to be understood that the invention is not limited to the precise configuration and components disclosed herein. Various modifications, changes, and variations, which will be apparent to those skilled in the art, may be made in the arrangement, operation, and details of the methods and systems of the present disclosure without departing from the spirit and scope of the disclosure.

What is claimed is:

1. A dual stage inflator for an inflatable vehicle safety device, the dual stage inflator comprising:
    a housing;
    a first combustion cup disposed in the housing; and
    a second stage combustion cup disposed in the housing, the second combustion cup including a first member and a second member, the second member formed separately from the first member and coupled to the first member, the first and second members cooperating to define an interior for receiving a second stage gas generant material, and
    a second stage cap closing an open end of the second stage combustion cup, the second stage cap axially spaced from a connection between the first and second members of the second stage combustion cup,
    wherein the first and second members cooperate to define a continuous combustion chamber closed by the second stage cap and receiving the second stage gas generant material,
    wherein one of the first and second members defines a male portion and the other of the first and second members defines a female portion receiving the male portion, and
    wherein the first member defines the female portion and the second member defines the male portion received by the female portion.

2. The dual stage inflator of claim 1, further comprising a first ignitor device extending into the first combustion cup and a second stage device extending into the second stage combustion cup.

3. The dual stage inflator of claim 1, further comprising an ignitor material disposed within the first combustion cup and a second gas generant material disposed within the second stage combustion cup.

4. The dual stage inflator of claim 1, wherein the first combustion cup includes an open upper end and the second member of the second stage combustion cup radially extends over and closes the open upper end.

5. The dual stage inflator of claim 1, wherein each of the first combustion cup, the first member of the second stage combustion cup and the second member of the second stage combustion cup has a cylindrical shape.

6. The dual stage inflator of claim 1, wherein the second member includes a first axially extending portion adjacent a first axial end and a second axially extending portion adjacent a second axial end, the first axially extending portion having a first inner diameter and the second axially extending portion having a second inner diameter, the second inner diameter being greater than the first inner diameter.

7. The dual stage inflator of claim 1, wherein the second member includes a first open axial end and a second open axial end, and further comprising the second stage cap sealing the second open axial end.

8. A method of assembling the dual stage inflator of claim 1, the method comprising:
    inserting the first member of the second stage combustion cup into the housing;
    inserting the first combustion cup into the housing;
    inserting the second member of the second stage combustion cup into the housing after the first member and the first combustion cup are inserted into the housing; and
    coupling the second member to the first member while the first and second members are in the housing.

9. The method of assembling the dual stage inflator of claim 8, further comprising:
    varying a volume of a second stage gas generant material within the second stage combustion cup to tune a performance of the dual stage inflator.

10. A dual stage inflator for an inflatable vehicle safety device, the dual stage inflator comprising:
    a housing;
    a first combustion cup disposed in the housing, the first combustion cup being a first stage combustion cup; and
    a second combustion cup disposed in the housing, the second combustion cup being a second stage combustion cup having a first axial end for receiving a second stage ignitor device and a second axial end opposite the first axial end, the second axial end being an open end closed by a cap secured to the open end,
    wherein the second stage combustion cup includes a first member and a second member, the second member formed separately from the first member and coupled to the first member, the first and second members cooperating to define a continuous combustion chamber receiving a second stage gas generant material, and
    wherein the second member of the second stage combustion cup includes a first axially extending portion and a second axially extending portion, the first axially extending portion being a connection portion for connecting to the first member, the first axially extending portion having a first inner diameter and the second axially extending portion having a second inner diameter, the second inner diameter being greater than the first inner diameter, the second axially extending portion radially extending over the first combustion cup and disposed to close an open end of the first combustion cup.

* * * * *